Sept. 13, 1938.  W. J. LUECKEL  2,130,323
CONVEYER SYSTEM
Filed June 24, 1936   3 Sheets-Sheet 1
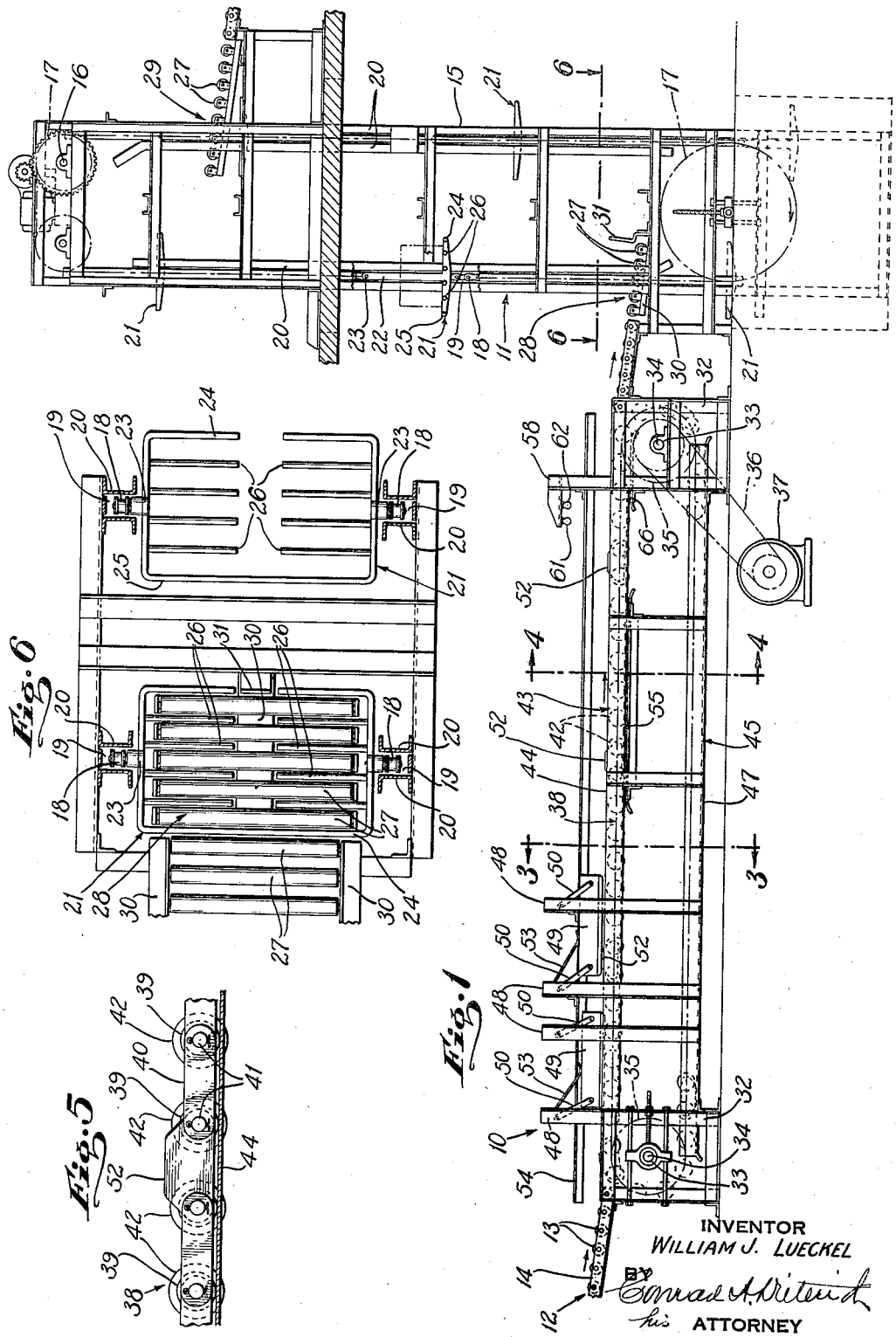
INVENTOR
WILLIAM J. LUECKEL
BY
his ATTORNEY Sept. 13, 1938. W. J. LUECKEL 2,130,323
CONVEYER SYSTEM
Filed June 24, 1936 3 Sheets-Sheet 2
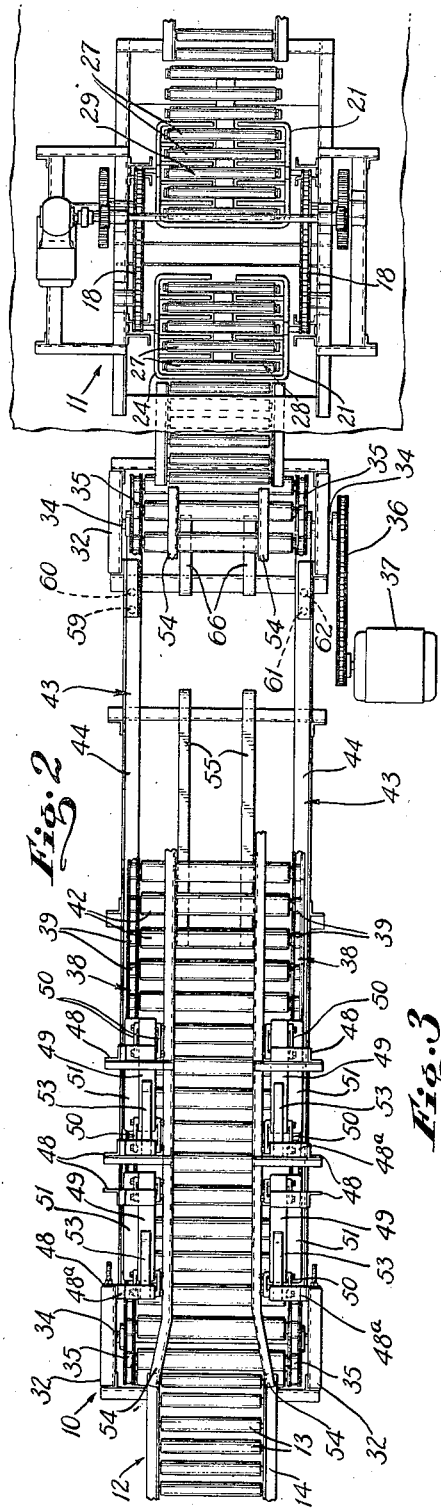
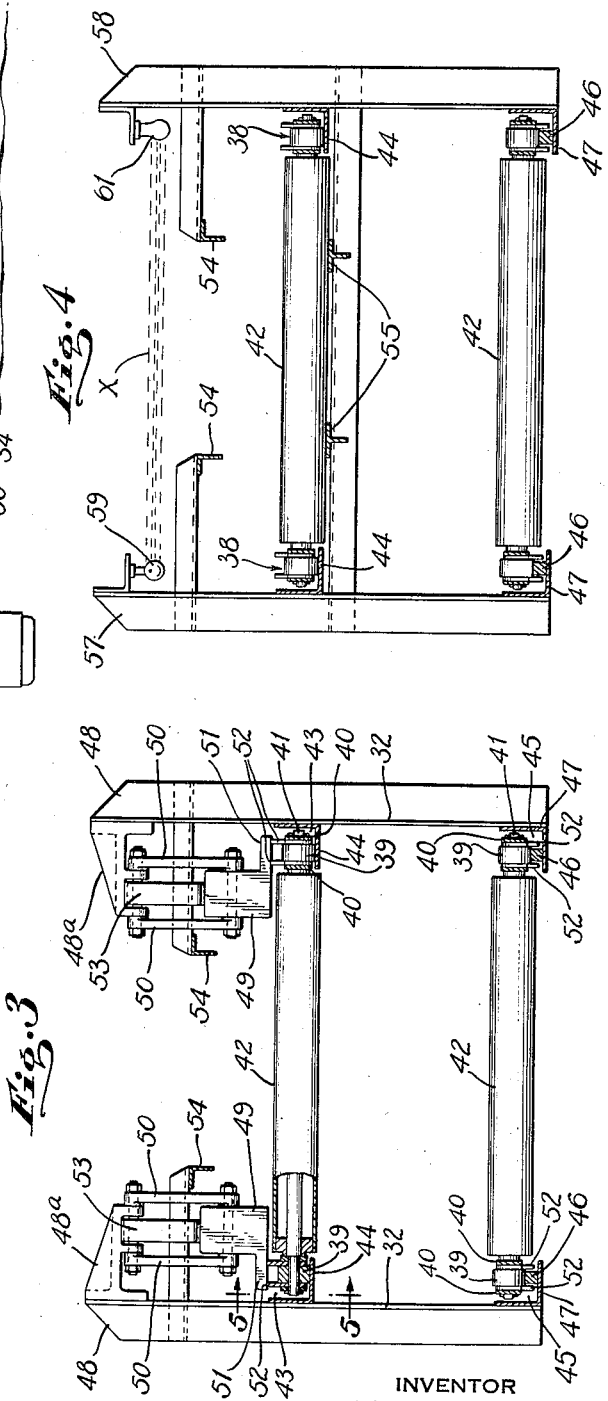
INVENTOR
WILLIAM J. LUECKEL
BY
Conrad A. Dieterich
his ATTORNEY

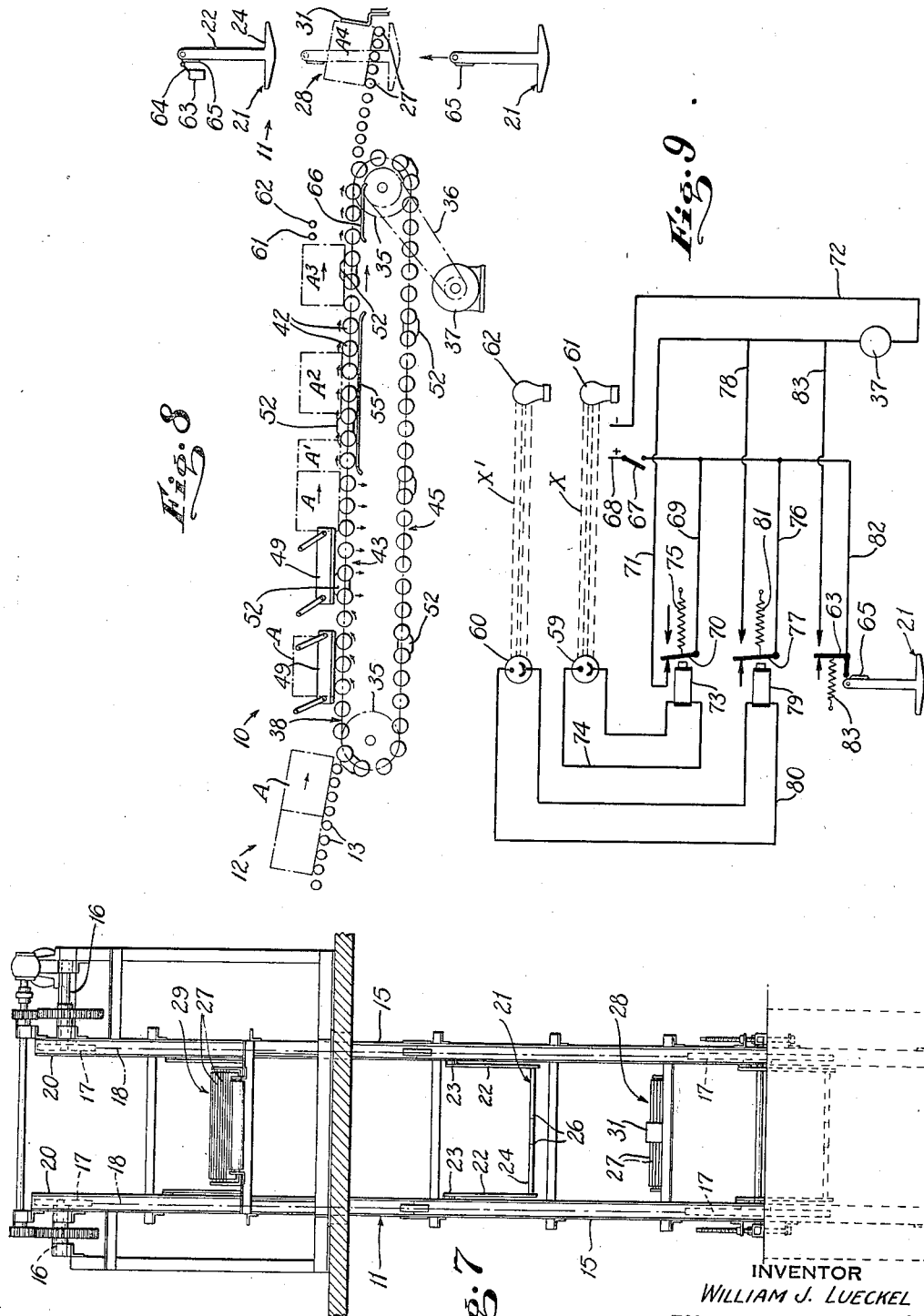

Patented Sept. 13, 1938

2,130,323

UNITED STATES PATENT OFFICE 2,130,323

CONVEYER SYSTEM

William J. Lueckel, New York, N. Y., assignor to Dunning Lueckel Engineering Company, New York, N. Y., a copartnership composed of Harry Dunning and William J. Lueckel Application June 24, 1936, Serial No. 86,913

17 Claims. (Cl. 198—21)

My invention relates to improvements in means for conveying or feeding a series of objects, articles or packages in succession to conveyers, machinery or other article-receiving apparatus, and the same has for its object to provide a simple, reliable and efficient apparatus or system, which operates to deliver the articles or objects to the receiving apparatus at rates satisfying or corresponding to the article intake rate thereof.

Further, said invention has for its object to provide a system of the character specified in which the actuating means thereof is in part under control of the article or object being conveyed or fed, and in part under control of the receiving apparatus or mechanism.

Further, said invention has for its object to provide a system of the character specified in which said conveying or feeding means operates automatically to control the spacing or separation between the successive articles or objects delivered thereto.

Further, said invention has for its object to provide a system of the character specified in which the conveying means thereof includes means operating first to retard the advance of the articles delivered thereto for effecting the spacing thereof on the conveyer and then to accelerate the advance of the foremost article so as to increase the separation thereof from those following.

Further, said invention has for its object to provide a system of the character specified in which the conveying means thereof is controlled to deliver to the receiving apparatus or mechanism articles or objects in accordance with the article intake rate of the receiving apparatus, irrespective of variations or differences in the sizes or dimensions of the article or objects being fed or delivered.

Further, said invention has for its object to provide a system of the character specified in which the actuating means for said system is under control of the receiving apparatus or mechanism for effecting the delivery of the articles or objects thereto at intervals coordinated with the operating cycle of said receiving apparatus.

Further, said invention has for its object to provide a system of the character specified in which the feeding or conveying means thereof is automatically arrested when the foremost article or object thereon attains a predetermined position for delivery of the article to the receiving mechanism or apparatus.

Further, said invention has for its object to provide a system of the character specified in which the conveying or feeding means thereof is under photoelectric control.

Further, said invention has for its object to provide a system of the character specified in which said photoelectric control is effective to interrupt the operation of the conveying or feeding means when an article thereon attains a predetermined delivery position, and to insure operation of said conveying means after said receiving apparatus ceases to function in causing the operation of said means until the next succeeding article or object attains said delivery position.

Other objects will in part be obvious, and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings—

Figure 1 is a side elevation showing one form of apparatus constructed according to and embodying my said invention;

Fig. 2 is a plan thereof;

Fig. 3 is an enlarged transverse section thereof taken on the line 3—3 of Fig. 1 looking in the direction of the arrow;

Fig. 4 is an enlarged transverse section thereof taken on the line 4—4 of Fig. 1 looking in the direction of the arrow;

Fig. 5 is a detail longitudinal section taken on the line 5—5 of Fig. 3;

Fig. 6 is a horizontal section through the receiving apparatus or lift taken on the line 6—6 of Fig. 1;

Fig. 7 is a front elevation of the lift;

Fig. 8 is a schematic view illustrating the operation, and

Fig. 9 is a wiring diagram.

Referring to the drawings, the system embodying my said invention includes a horizontally extending conveyer 10 for delivering or feeding the articles or objects, such as packages, boxes, containers, etc. to other mechanism or apparatus 11 for treatment or for delivery to other points as when the article receiving apparatus consists of another conveyer. An example of such receiving conveyer 11 is the vertical lift of the swing tray type herein illustrated and hereinafter more fully described. The articles or objects may be delivered to the conveyer 10 by the conveyer 12 which is of the gravity feed type which includes a succession of rollers 13 mounted upon a suitable frame 14 in position for delivery of the packages or other articles to the conveyer 10.

The conveyer 11 illustrated is of the usual swing tray type and comprises a vertical framework 15 having rotatable shafts 16 journaled therein at opposite ends, and each carrying at opposite ends the sprockets 17. Power may be applied to one of the shafts 16 in any suitable manner. Endless carrier chains 18 are disposed about the sprockets 17, the opposing runs 19 thereof being retained within the vertical guides or rails 20 upon the framework. The corresponding runs 19 support at spaced points therealong a series of swing trays 21 each including the arms 22 pivoted at 23 to the runs 19 and carrying at the lower ends thereof the carrier 24 for supporting the article or object to be elevated. The article supporting members or carriers 24 each preferably comprises an enclosing frame 25 and opposing sets of fingers 26 forming an open structure for clearing the rollers 27 of the loading station 28 and of the discharge station 29, the spacing between the fingers 26 and between the rollers 27 being correlated to effect this purpose. The loading station 28 includes a suitable frame 30 disposed at a slight inclination. The rollers 27, preferably ball bearing, are mounted thereon and register with the discharge end of the conveyer 10 so that the packages or other articles may be discharged therefrom to gravitate into position against the stop 31 at the loading station to be picked up by one of the carriers 24 as the same moves past said rollers in intercalated relation thereto.

The conveyer 10 includes a suitable framework 32 having journals 33 at the opposite ends thereof for the transversely disposed rotatable shafts 34 each carrying a pair of sprockets 35. One of the shafts 34 is driven by the chain drive 36 through an electric motor 37. The corresponding sprockets 35 at each side of the frame 32 carry an endless conveyor chain 38, preferably comprising a series of narrow rollers 39 connected together by the side links 40 through the transversely extending shafts 41 upon the ends of which the rollers 39 are rotatably mounted and the contiguous ends of the links 40 pivotally secured to form a flexible chain structure. Each of the shafts 41 serves as a bearing for the rotatable article supporting rollers 42. The rollers 42 of the upper runs 43 of the chains 38 ride upon longitudinally extending track angles 44 at opposite sides of the frame. The rollers of the lower runs 45 ride upon the relatively-elevated, longitudinally extending tracks 46 carried by the angle members 47. The frame 32 contiguous to the receiving end thereof supports vertically extending stanchions 48 having inwardly directed brackets 48ᵃ at the upper ends, two pairs of said stanchions 48 being illustrated at each side of the frame. Each pair of brackets 48ᵃ serves as a support for a shoe 49 which is pivotally suspended therefrom by the links 50 in position over the outer portions of the rollers 42 and normally free to engage the same. Each of the shoes 49 is provided with a lug 51 extending over the contiguous upper run 43 in position to be engaged by the lugs 52 forming extensions upon certain of the chain links 40. The lugs 52 are spaced apart equal distances along the chains, and hence periodically engage the lugs 51 to disengage the shoes 49 from the rollers 42. Preferably the weight of the shoes 49 upon the rollers 42 is supplemented by leaf springs 53 anchored at one end to the brackets 48ᵃ and engaging at the free end thereof the shoes 49. By providing the elevated tracks 46 for the lower runs 45 the lugs 52 are allowed to clear the return track angle 47 when in depending position. When the shoes 49 engage the rollers 42, as the conveyer moves longitudinally, the engagement causes the rollers 42 supporting the package to rotate counter-clockwise or in a direction opposite to the direction of travel of the conveyer 10 at the same rate that the chain travels forwardly, thereby to retard the advance of the packages and control the spacing between the successive packages on the conveyer. Suitable guards 54 may be placed at the inner sides of the swinging shoes 49 for centering the packages upon the rollers 42.

As the package approaches the discharge end of the conveyer 10, I provide means to cause a more speedy advance of the package, and to increase the separation thereof from the next succeeding package. This means comprises a pair of longitudinally extending members or runners 55 carried by the framework 32 and in position to engage the rollers 42 as the conveyer travels towards the discharging position. During travel of the conveyer the rollers 42 engaging the runners 55 are rotated now in clockwise direction or in the direction of travel at the same rate that the conveyor is traveling to impart twice the speed of travel to the package and increase the separation thereof from those following.

The feeding operation of the conveyer 10 is coordinated with the operation of the article-receiving apparatus 11 to deliver the packages thereto in accordance with the article intake rate of the receiving apparatus. In order to effect said coordination I preferably control the operation of the motor 37, and hence of the conveyer 10 in part by the action of the package itself, and in part by the action of the receiving conveyer 11. The motor control 56 subjected to the action of the package is mounted upon two pairs of uprights 57 and 58 located adjacent to the discharge end of the conveyer at opposite sides thereof, and above the plane of the upper run 43 thereof. The uprights 57 at one side of the conveyer serve as supports for a pair of photoelectric cells 59 and 60 spaced apart longitudinally a suitable distance in the direction of travel. The other uprights 58 serve as supports for light sources 61 and 62 for directing beams of light across the path of the moving packages on the conveyer for impingement respectively upon the photoelectric cells 59 and 60 which control the circuit of the motor 37 as hereinafter more fully described. The control of the motor 37 by the receiving apparatus 11 is effected through a switch 63 disposed in the path of the successive trays 21. The switch 63 includes an actuating arm 64 disposed in the path of the projections or lugs 65 preferably located upon the hangers 22 of the successive trays and actuated thereby to close the motor circuit through said switch 63. The actuating lug 65 has a prolonged dwell, slightly longer than the distance between the photoelectric cells 59 and 60 for keeping the motor circuit closed for a period corresponding thereto. The travel of the packages between the photoelectric control 56 and the receiving station 28 is accelerated by the longitudinal strips or runners 66 engaging the lower side of the rollers 42 located below and in advance of the control 56 and causing the same to rotate in the direction of movement of the conveyer for effecting the rapid discharge of the package to the station 28.

In Fig. 9 is shown a diagram of the motor circuits and the controls therefor. When the starting switch 67 in the conductor 68 from the line is closed, the motor circuit is normally closed through conductor 69, switch 70 and conductor 71 to one side of the motor, and from there through conductor 72 to the other side of the line. The switch 70 is controlled by a relay 73 in the circuit 74 energized by the photoelectric cell 59 normally subjected to the action of the beam of light X from the lamp 61. The switch 70 is biased to open position by a spring 75.

A parallel circuit to the motor is also provided from the line 68 over conductor 76, normally open switch 77 and conductor 78. The switch 77 is controlled by a relay 79 in the circuit 80 energized by the photoelectric cells 60 subjected to the action of the beam of light X' from the lamp 62. The switch 77 is biased to circuit closing position by the spring 81 when the relay 79 is deenergized.

A parallel circuit to the motor is also provided from the line 68 over conductor 82, normally open switch 63 and conductor 83. The switch 63 is biased to open position by a spring 83 and is actuated to closed position by the actuating lugs 65 upon the trays or carriers 24.

In operation, when the motor 37 starts, the conveyer 10 moves in the direction of the arrow (Fig. 8). The packages A are delivered successively to the conveyer 10 from the feed conveyer 12 and rest upon the supporting rollers 42 of the upper run 43. As the rollers 42 on which a package is supported become subject to the action of the shoes 49, the rollers subjected to said action are rotated in a direction opposite to the direction of conveyer travel for retarding the advance of the package as indicated at A, Fig. 8. The retarding means 49 are raised and lowered alternately by the equi-spaced lugs 52, and the successive pairs of shoes 49 arranged in tandem are actuated to alternately engage the rollers 42, the actuating lugs 52 being spaced apart along the runs 43 and 45 distances sufficiently great to actuate the shoes 49 in succession, and with a frequency imparting the required spacing to the successive packages. In general, the length of the shoes 49, the number thereof in tandem, their separation, and the spacing between the successive lugs 52 are correlated to cause, as the conveyer moves, separation between the successive packages thereon in accordance with the sizes or dimensions thereof. When a package, spaced from the other, as above described, arrives at a position A', and the rollers 42 thereunder engage the roller actuating runners 55, the rollers are rotated by said means 55 to advance the packages to position at A² at twice the speed that it had before to effect a substantial separation or segregation of the package at A² from those following. When the package arrives at the position A³ it blocks off the beam of light X from the lamp 61 directed upon the cell 59. The resulting drop in voltage in the cell 59 substantially deenergizes the relay 73 to open the parallel motor circuit at the switch 70 (which circuit had been closed up to that time for operating the conveyer) and thereby stop the motor 37 and the operation of the conveyer 10. The circuit through the motor then remains open until the swing tray 21 next clearing the loading station 28 actuates the switch 63 to close the other parallel circuit 82—83 through the motor causing a resumption of the operation of the conveyer 10. The dwell upon the actuating lug 65 and the location of the same is such that the circuit 82—83 remains closed until package at A³ attains a position blocking off the beam of light X' from the lamp 62 directed upon the cell 60. Whereupon the relay 79 is deenergized to release the switch 77 and close the other parallel circuit through the motor 37 to insure continuance of the operation of the conveyer 10. During this stage of operation the package is rapidly discharged through the field of the beams X X', and into the loading station 28 in position to be lifted or picked up by the next succeeding tray or carrier 24. As the package clears the beam X the parallel circuit through the switch 70 closes to insure continuance of the motor and conveyer operation, and as the package clears the second beam X' the parallel circuit at switch 77 again opens, the conveyer continuing to operate until the next succeeding package blocks off the beam X to again stop the motor, repeating the cycle of operation above described.

By my invention I am enabled to deliver packages or other articles or objects of the same or different sizes to other apparatus or mechanism, such as tray elevators, filling and wrapping machines or the like, operating under independent power, at different rates of speed or otherwise, at definite intervals corresponding to the article intake rate of the receiving apparatus.

The apparatus embodying my said invention is under automatic control so that movement thereof ceases when an article to be discharged reaches a predetermined position relative to the receiving apparatus, and has been substantially separated from the next succeeding article on the conveyer. The article is rapidly discharged from the conveyer by control of the receiving apparatus which again closes the motor circuit of the conveyer when the receiving apparatus has attained to proper receiving position, the operation serving to reset the delivering apparatus for operation until the next succeeding article thereon attains its discharging position.

Having thus described my said invention what I claim and desire to secure by Letters Patent is:

1. A system of the character described comprising a longitudinally movable conveyer, means for actuating said conveyer, means associated with said conveyer and operated thereby for spacing the articles on the conveyer one from the other, means associated with said conveyer for accelerating the advance of the article to be discharged to increase the separation thereof from the next succeeding article, means for receiving the article to be discharged, means beyond the accelerating means subject to the action of the article to be discharged for controlling the actuating means to interrupt the operation of the conveyer, and means for restarting the conveyer and maintaining operation thereof until the next article on the conveyer attains a position for operating said controlling means to again interrupt the operation of the conveyer.

2. A system of the character described comprising a movable conveyer, means for actuating said conveyer, means for receiving articles discharged from said conveyer, automatically operated means normally in conveyer operating position for stopping the conveyer when an article thereon attains a position to be discharged, automatically operated means normally in inoperative position for starting the conveyer when said receiving means approaches a position to receive the article to be discharged, and automatically operated means controlling the conveyer operation independently of the position of both of said first-named automatically operated means and normally in inoperative position for insuring continued operation of said conveyer upon discharge of said article.

3. A system of the character described comprising a movable conveyer, means for actuating said conveyer, means for receiving articles discharged from said conveyer, a succession of means associated with said conveyer and subject to the action of the moving articles thereon for controlling the operation of said conveyer, one of said means being operated as an article on the conveyer attains a position to be discharged for stopping the operation of the conveyer, and the other thereof being operated by the discharge of the article for maintaining the conveyer in operation after the restarting thereof, and means operated at said receiving means for restarting said conveyer.

4. A system of the character described comprising a movable conveyer, means for actuating said conveyer, means for receiving articles discharged from said conveyer, means for controlling the operation of the conveyer and normally in position to cause the operation thereof, said means being subject to the action of the articles on the conveyer for stopping the operation thereof when each article thereon attains a position to be discharged, means under control of said receiving means for starting the operation of said conveyer as said receiving means approaches a position to receive the article to be discharged, and means subject to the action of the article discharged for controlling the operation of said conveyer to maintain movement thereof while said first named control means is subject to the action of the article being discharged.

5. A system of the character described comprising a movable conveyer, means for actuating said conveyer, means for receiving articles discharged from said conveyer, means controlled by articles on the conveyer for stopping the operation of the conveyer when each article thereon attains a position to be discharged, means operated by the movement of said receiving means for starting the operation of the conveyer to discharge said article, and means under control of the article being discharged for maintaining said conveyer in operation until said first control means returns to conveyer operating position.

6. A system of the character described comprising a movable conveyer, means for actuating said conveyer, means for receiving articles from said conveyer, a plurality of conveyer controlling means subject successively to the action of each article on the conveyer as the same is moved respectively into position to be discharged and is discharged from the conveyer, said control means being coordinated in operation to cause the conveyer to stop upon the actuation of the first control means and to maintain the conveyer in operation upon restarting, and control means actuated by the receiving means for starting the operation of the conveyer to cause the discharge of said article and the actuation thereby of said second control means.

7. A system of the character described comprising a movable conveyer, means for actuating said conveyer, means for receiving articles from said conveyer, a plurality of conveyer controlling means subject successively to the action of the articles on the conveyer as each thereof is moved into position to be discharged, and is discharged respectively, the first of said control means being actuated to stop the conveyer and the second thereof being actuated after restarting to maintain the conveyer in operation until said first control again becomes operative for said purpose, and means actuated adjunctively to the movement of the receiving means for starting the operation of the conveyer to cause the discharge of the article and to render the second control operative to continue movement of the conveyer.

8. A system of the character described comprising a movable conveyer, an electric motor including the circuit thereof for actuating the conveyer, means for receiving articles discharged from said conveyer, means for controlling the motor circuit operating to open the motor circuit and stop the conveyer as an article thereon attains a position to be discharged and to close the motor circuit and maintain the conveyer in operation upon the discharge of said article, and means operated by the article receiving means for closing the motor circuit and starting the conveyer operation to discharge said article as said article receiving means approaches a position to receive the same.

9. A system of the character described comprising a movable conveyer, an electric motor including the circuit thereof for actuating the conveyer, means for receiving articles discharged from said conveyer, means normally functioning to close said circuit for causing operation of the conveyer and operated to open said circuit as an article on the conveyer attains a position to be discharged, means operated as said receiving means approaches a position for receiving the article for again closing the motor circuit to effect the discharge of the article, and means operated as said article is discharged for maintaining the motor circuit closed after said second control ceases to function and until said first circuit control resumes its normal function.

10. A system of the character described comprising a movable conveyer, a motor for actuating said conveyer having a plurality of parallel circuits, means for receiving articles discharged from said conveyer, a normally closed control means for one circuit subject to the action of an article on the conveyer as the same attains a predetermined position relative to the article receiving means for controlling said motor to stop the operation of the conveyer, a normally open control means for a second circuit operated at the article-receiving means for controlling the motor to start the operation of the conveyer, and a normally open control means for a third circuit subject to the action of the article being discharged for controlling the motor to maintain the conveyer in operation until the discharge of the article is effected.

11. A system of the character described comprising a movable conveyer, means for actuating said conveyer, means for receiving articles discharged from said conveyer, photoelectric means subject to the action of an article on the conveyer as the same approaches the discharge end thereof for interrupting the operation of the conveyer and for maintaining the operation thereof after again restarting, and means for restarting the operation as the receiving means approaches a position to receive said article.

12. A system of the character described comprising a movable conveyer, means for actuating said conveyer, means for receiving articles discharged from said conveyer, photoelectric means subject to the action of an article on the conveyer for interrupting the operation thereof, photoelectric means in advance thereof subject to the action of the article for maintaining the conveyer in operation while said first photoelectric means remains inoperative, and means under control of said receiving means for restarting the operation of the conveyer.

13. A system of the character described comprising a movable conveyer, an electric motor for actuating said conveyer, circuit connections for said motor, means for receiving articles discharged from said conveyer, photoelectric means spaced apart in the direction of travel of the conveyer adjacent to the discharge end thereof subject to the action of the article to be discharged, certain of said photoelectric means when subjected to the article controlling said circuit connections to stop the motor, and other of said photoelectric means when subjected to the article controlling said circuit connections to maintain the motor in operation while said first photoelectric means remains subject to the article, and means for controlling said circuit connections to restart the motor as said receiving means approaches a position to receive the article.

14. A system of the character described comprising a movable conveyer including transversely disposed rotatable rollers, a support, means movably mounted upon said support and normally engaging said rollers for imparting rotation thereto as the conveyer travels, and means on the conveyer for actuating said means to disengage the rollers.

15. A system of the character described comprising a movable conveyer including transversely disposed rotatable rollers, means engageable with said rollers for rotating the same in a direction to retard the advance of the article thereon, means on the conveyer for actuating said means to disengage the rollers, and means therebeyond constantly engaging said rollers for rotating said rollers in a direction to accelerate the advance of the article thereon.

16. A system of the character described comprising a longitudinally movable endless conveyer including transversely disposed rotatable rollers, means normally engaging said rollers towards the receiving end of the conveyer for retarding the advance of the articles thereon, means carried by said conveyer at spaced points thereon for periodically actuating said retarding means to disengage said rollers, whereby to space the successive articles on the conveyer, and means normally engaging the rollers therebeyond for accelerating the advance of the article to be discharged to increase the separation thereof from the next succeeding article.

17. A system of the character described comprising a longitudinally movable conveyer including transversely disposed rotatable rollers, means for actuating said conveyer, means normally engaging said rollers towards the receiving end of the conveyer for retarding the advance of the articles on the conveyer, means on the conveyer for periodically actuating said retarding means for disengaging said rollers to space the articles from each other, means normally engaging said rollers for accelerating the advance of the article to be discharged to increase the separation thereof from the next succeeding article, means for receiving the articles discharged, means beyond the accelerating means subject to the action of the article to be discharged for controlling the actuating means to interrupt the operation of the conveyer and maintain operation upon restarting, and means controlled by the receiving means for restarting the conveyer.

WILLIAM J. LUECKEL.